Patented Aug. 28, 1934

1,971,742

UNITED STATES PATENT OFFICE 1,971,742

PRODUCTION OF PRIMARY ALCOHOLS

Heinrich Bertsch, Chemnitz, Germany, assignor, by mesne assignments, to American Hyalsol Corporation, Wilmington, Del., a corporation of Delaware No Drawing. Application August 2, 1930, Serial No. 472,764. Renewed February 2, 1934. In Germany September 23, 1929

8 Claims. (Cl. 260—156)

This invention relates to a process for the production of primary alcohols.

It is known that monovalent or polyvalent primary alcohols corresponding to the alkyl esters of monobasic or polybasic acids can be produced by the action of sodium and anhydrous lower alcohols, for example ethyl, propyl or amyl alcohols, on the said esters. A process of this type is disclosed, for instance, in the U. S. patent to Bouveault and Blanc No. 868,252, granted October 15, 1907. The procedure adopted in this case was to introduce sodium in pieces into the reaction vessel and to allow a mixture of the ester to be reduced and a multiple quantity of the anhydrous lower alcohol to flow in. This process, however, in most cases results in poor yields despite the use of a large excess of sodium and alcohol. The sodium alcoholate formed reacts as a saponifier with a part of the ester which thereby is withdrawn from the reaction, because neither the acid set free from the ester nor its sodium salt are capable of being reduced under the conditions obtaining.

With a correct knowledge of these hinderances to the quantitative course of the reduction of acid esters, a proposal was then made to effect the reduction with sodium at lower temperatures in ethereal solution, which during the entire reaction is kept neutral or even slightly acid by dropping in dilute acetic acid. This process has, however, the disadvantage that it is difficult to maintain the correct quantity of acid during the whole course of the reaction. Now any excess of acid is injurious since the solution of the sodium is thereby very much accelerated and the hydrogen escapes too quickly before the reduction of the ester, which is a non-ionic reaction and, therefore, takes a certain time, is completed.

According to the invention it has been found that considerably better results are obtained if in the reduction of esters by means of alkali metals in alcoholic solution a considerable excess pressure of hydrogen is allowed to act on the reaction mixture. Thereby the separation of the hydrogen at the surface of the sodium takes place under a certain pressure. The pressure is so chosen that the reaction of the alcohol with the alkali metal is thereby prolonged, but is not inhibited. For example the pressure employed in the reduction with sodium and ethyl alcohol at room temperature amounts to about 15-20 atmospheres.

It is advantageous during the reaction to force a moderate stream of carbon dioxide into the reaction mixture which is under pressure. Thereby on the one hand the sodium alcoholate formed during the reaction is decomposed and its saponifying action on the still unattached part of the ester prevented, while on the other hand no excess of acid can arise in the solution, such as can scarcely be avoided when employing acetic acid, since the unused carbon dioxide escapes from the solution into the gas space.

The alkali metal can also be used in the form of a dispersion in an inert agent such as, for example xylene, instead of in pieces. In this case the mixture of an alcohol with the ester to be reduced can be allowed to flow into the dispersion of, for example sodium in xylene. Thereby a considerable increase of the reacting surface is obtained and the reaction period is correspondingly reduced.

What I claim is:—

1. A process for the production of primary alcohols which consists in reducing the acid esters of organic acids of the carboxylic group with alkali metals and lower alcohols in the presence of a pressure of hydrogen of about 15 to 20 atmospheres.

2. A process for the production of primary alcohols which consists in reducing the acid esters of organic acids of the carboxylic group with alkali metals and lower alcohols in the presence of hydrogen and forcing carbon dioxide through the reaction mixture which is under pressure.

3. A process for the production of primary alcohols which consists in reducing the acid esters of organic acids of the carboxylic group with alkali metals in a finely divided state and lower alcohols in the presence of an excess pressure of hydrogen in excess of about 15 atmospheres but insufficient to inhibit the reaction of the lower alcohol with the metal.

4. A process for the production of primary alcohols which consists in reducing the acid esters of organic acids of the carboxylic group with alkali metals in a finely divided state and lower alcohols in the presence of hydrogen and forcing carbon dioxide through the reaction mixture which is under pressure.

5. A process for the production of primary alcohols which consists in reducing the acid esters of organic acids of the carboxylic group with alkali metals dispersed in an inert solvent and lower alcohols in the presence of about 15 to 20 atmospheres pressure of hydrogen.

6. A process for the production of primary alcohols which consists in reducing the acid esters of organic acids of the carboxylic group with alkali metals dispersed in an inert solvent and lower alcohols in the presence of hydrogen and forcing carbon dioxide through the reaction mixture which is under pressure.

7. A process for the production of primary alcohols which consists in reducing the acid esters of organic acids of the carboxylic group with alkali metals dispersed in xylene, and lower alcohols in the presence of an excess pressure of hydrogen in excess of about 15 atmospheres but insufficient to inhibit the reaction of the lower alcohol with the metal.

8. A process for the production of primary alcohols which consists in reducing the acid esters of organic acids of the carboxylic group with alkali metals dispersed in xylene, and lower alcohols in the presence of hydrogen and forcing carbon dioxide through the reaction mixture which is under pressure.

HEINRICH BERTSCH.